US007907081B2

(12) United States Patent
Noyman

(10) Patent No.: US 7,907,081 B2
(45) Date of Patent: Mar. 15, 2011

(54) MILLIMETER WAVE IMAGING SYSTEM

(75) Inventor: Yonatan Noyman, Morshet (IL)

(73) Assignee: Rafael - Armament Development Authority Ltd., Haifa (IL)

( * ) Notice: Subject to any disclaimer, the term of this patent is extended or adjusted under 35 U.S.C. 154(b) by 317 days.

(21) Appl. No.: 12/159,101

(22) PCT Filed: Dec. 25, 2006

(86) PCT No.: PCT/IL2006/001481

§ 371 (c)(1), (2), (4) Date: Jun. 25, 2008

(87) PCT Pub. No.: WO2007/074443

PCT Pub. Date: Jul. 5, 2007

(65) Prior Publication Data

US 2008/0291109 A1 Nov. 27, 2008

(30) Foreign Application Priority Data

Dec. 25, 2005 (IL) .......................................... 172803

(51) Int. Cl.
*G01S 13/89* (2006.01)

(52) U.S. Cl. .............................. 342/22; 342/90; 342/179

(58) Field of Classification Search .................... 342/22, 342/90, 179

See application file for complete search history.

(56) References Cited

U.S. PATENT DOCUMENTS

| | | | | |
|---|---|---|---|---|
| 2,682,491 | A * | 6/1954 | Hahn | 343/912 |
| 3,953,858 | A | 4/1976 | Ohm | |
| 4,635,071 | A * | 1/1987 | Gounder et al. | 343/897 |
| 4,805,622 | A * | 2/1989 | Riedlinger et al. | 600/442 |
| 4,910,523 | A * | 3/1990 | Huguenin et al. | 342/179 |
| 5,121,124 | A * | 6/1992 | Spivey et al. | 342/179 |
| 5,760,397 | A | 6/1998 | Huguenin et al. | |
| 6,986,592 | B2 | 1/2006 | Arnold | |
| 2008/0291109 | A1* | 11/2008 | Noyman | 343/834 |

OTHER PUBLICATIONS

Cooper, K.B.; Dengler, R.J.; Chattopadhyay, G.; Schlecht, E.; Gill, J.; Skalare, A.; Mehdi, I.; Siegel, P.H.; , "Submillimeter-wave active radar imager," Infrared and Millimeter Waves, 2007 and the 2007 15th International Conference on Terahertz Electronics. IRMMW-THz. Joint 32nd International Conference on , vol., No., pp. 922-923, Sep. 2-9, 2007.*

Passive millimetre-wave imaging architectures paper by Alan H Lettington et al. 2003, J. Opt. A: Pure Appl. Opt. 5, S103-S110.

E. N. Grossman and A. J. Miller,2003, proceeding of SPIE, vol. 50277, pp. 62-70.

* cited by examiner

*Primary Examiner* — John B Sotomayor

(57) ABSTRACT

An imaging system operative in a frequency range starting from X band and including the terahertz region has a receiving antenna having a spheroidal reflector. One or more arrays of detectors disposed at the focus adjacent to the reflector of the receiving antenna provides for imaging targets within a range of a few meters around the second focus of the spheroidal reflector. Images of targets such as of concealed objects under clothing are generated and displayed as is known in the art. A method for manufacturing reflectors of receiving antennae given a detection range and a focal range is provided.

7 Claims, 2 Drawing Sheets

MILLIMETER WAVE IMAGING SYSTEM

FIELD OF THE INVENTION

The present invention relates in general to imaging systems operative in the millimeter wave region. In particular the present invention relates to ellipsoidal shaped antennae reflector of active and or passive imaging systems in the range of frequencies starting in X band and including the terahertz region.

BACKGROUND OF THE INVENTION

Passive and active millimeter-wave imaging systems for a variety of applications are known. A comprehensive review of architectures of passive millimeter-wave (MMW) imaging systems is given for example in a paper by Alan H Lettington et al. 2003, J. Opt. A: Pure Appl. Opt. 5, S103-S110. The paper includes sources of radiation, atmospheric transmission, various types of available imaging system and a brief summary of exemplary applications. Specific issues related to detection capabilities provided by active imaging systems and a comparison between imaging with focal plan array antennae versus scanning an image by a single pixel are discussed for example in a paper of E. N. Grossman and A. J. Miller, 2003, Proceedings of SPIE, Vol. 50277, pp 62-70. Typically such systems consist of components such as lenses for optical beam forming and employ mechanical beam steering. However MMW lenses are somewhat impractical in cases in which the required range of detection, or the range to the target to be imaged, exceed a few meters. Therefore, an improved converging optics is called for.

DETAILED DESCRIPTION OF THE PRESENT INVENTION

Figure 1:
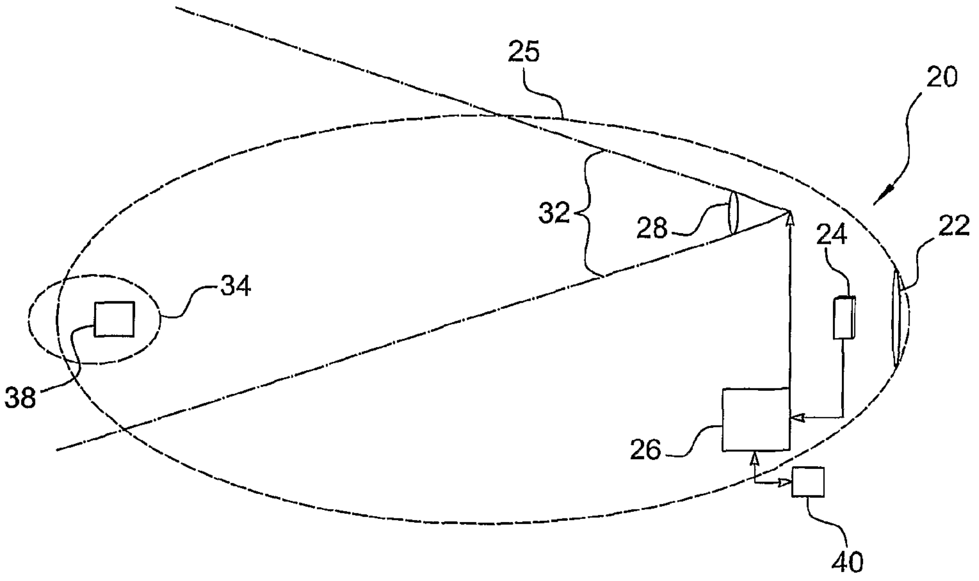
FIG. 1 is a scheme of an active millimeter wave imaging system according to the present invention.

The structural aspects of an active and or passive imaging systems of the invention accommodated to a frequency range starting from X band and including the terahertz region, and the method of its operation are hereinafter described. Reference is made to FIG. 1 in which an active imaging system (AIS) 20 operative in the millimeter wave range has a receiving antenna with ellipsoidal reflector 22. One, or more arrays of detectors, as with array 24, disposed at a focus of ellipsoid 25 adjacent to reflector 22. Ellipsoid 25 has two foci located on its major axis, the first focus near reflector 22 and a second focus in the far side of the ellipsoid at a distance from the reflector. Signals received in detectors of array 24 are detected and transferred to an imaging processor, not shown, disposed in main imaging system unit 26. A transmitter of millimeter waves and/or sub-millimeter waves, and an array or arrays of transmitters 28 illuminate a segment of the ellipsoidal shaped field of view of the receiving antenna. Rays 32 designate the illuminating beam. The transmitter, or transmitters are such disposed that a significant region around the second focus of the spheroid is substantially homogeneously illuminated. Any ray of the illuminating beam reflected from an object within a first region 34 centered at the second focus of the ellipsoid that is distant from the receiving antenna, and further impinging on reflector 22 is again reflected into a second region, not shown, which is centered at the first focus of ellipsoid 25 adjacent to reflector 22. Such a reflected radiation impinges on detectors of array 24, generating an electric signal that is further detected and transferred to the imaging processor. Images of such illuminated objects, as is FIG. 38, are displayed over a display of operator interface unit 40.

The detection of the reflected radiation is either coherent or incoherent as in the prior art. At a time in which efficient detectors in the terahertz region, such as manufactured by employing nanotechnology techniques, will become available, active and passive imaging system operative in this frequency region will be similarly configured employing an ellipsoidal shaped receiving antenna reflector, according to the present invention. (Except for avoiding the illuminating transmitters in configurations of the passive imaging systems.)

Reflector of the Receiving Antenna

Figure 2:
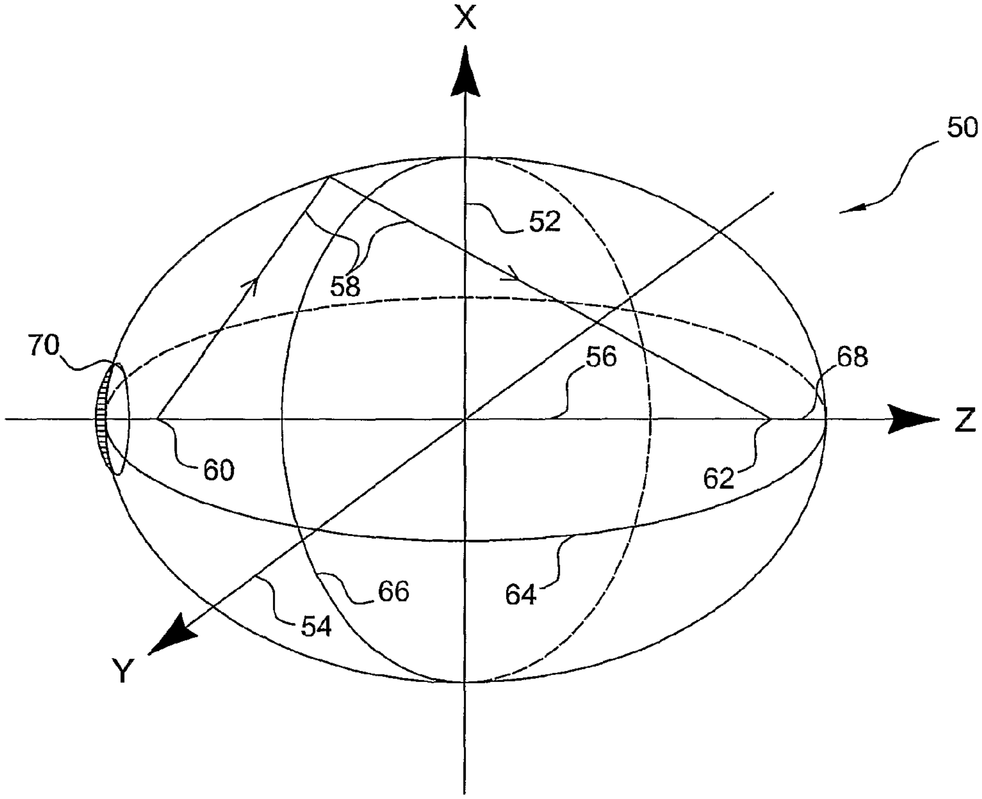
FIG. 2 is a presentation of a spheroid in a Cartesian coordinate system.

Design rules for manufacturing spheroidal reflectors according to the present invention are hereinafter described with reference to FIG. 2. In the figure, a general ellipsoid is shown in a Cartesian coordinate system. The surface of ellipsoid 50 the three major axes of which are designated by 52, 54, 56 are of lengths c, b and a respectively, is represented by equation 1:

$$\frac{x^2}{c^2}+\frac{y^2}{b^2}+\frac{z^2}{a^2}=1. \quad (1)$$

Any ray of electromagnetic radiation, such as ray 58, emerging from focus 60 is reflected to pass through focus 62. Rotating an ellipse such as ellipse 64, around one of its axes, such as axis 56, creates a three dimensional body called a spheroid. The lengths of the axes of this spheroid are b, b, a respectively. Ellipse 66 becomes by such rotation a circle, the radius of which is of a length b. The eccentricity of ellipse 64, designated by the letter "e", is represented by equation 2:

$$e=\frac{\sqrt{a^2-b^2}}{a^2}=\sqrt{1-\frac{b^2}{a^2}}. \quad (2)$$

This spheroid has two foci: 60 and 62, and its focal length 68 is denoted hereinafter by "f". The present invention concerns cases in which the length b of the minor axis of the spheroid, is considerably smaller than the length a of the major axis.

Detection range "L" is the distance from the AIS to a detectable target. An approximation of this range is made by considering major axis a to be equal to about one half of the detection range, as is represented by equation 3:

$$a\approx\frac{L}{2}. \quad (3)$$

For given values of the spheroid axes' lengths a and b, a general radius R and a deformation factor q exist to fulfill the relationships as in equation 4:

$$a = \frac{R}{q}, b = \frac{R}{\sqrt{q}}, \tag{4}$$

where q>0, and q<<1.

The eccentricity of the spheroid is then represented by equation 5:

$$e = \sqrt{1-q} \approx 1 - \frac{q}{2} - \frac{q^2}{8}, \tag{5}$$

and the focal length is represented by equation 6:

$$f = a(1-e) \approx \frac{R}{q}\left(1 - \left(1 - \frac{q}{2} - \frac{q^2}{8}\right)\right) = \frac{R}{2}\left(1 + \frac{q}{4}\right). \tag{6}$$

Substituting a and b with R and q respectively, result in equations with R and q whose solutions for given values of the focal length f and the detection range L are provided in equation 7:

$$q = 2\left\{\sqrt{1 + \frac{4f}{L}} - 1\right\} \approx \frac{4f}{L}\left(1 - \frac{f}{L}\right) \tag{7}$$

and in equation 8:

$$R = \frac{Lq}{2} = 2f\left\{1 - \frac{f}{L}\right\}. \tag{8}$$

The minor axis of the spheroid is represented by equation 9:

$$b = \sqrt{fL(1 - f/L)} \tag{9}$$

As a result, the spheroid is completely defined for given values of a focal length f and a detection range L.

Figure 3:
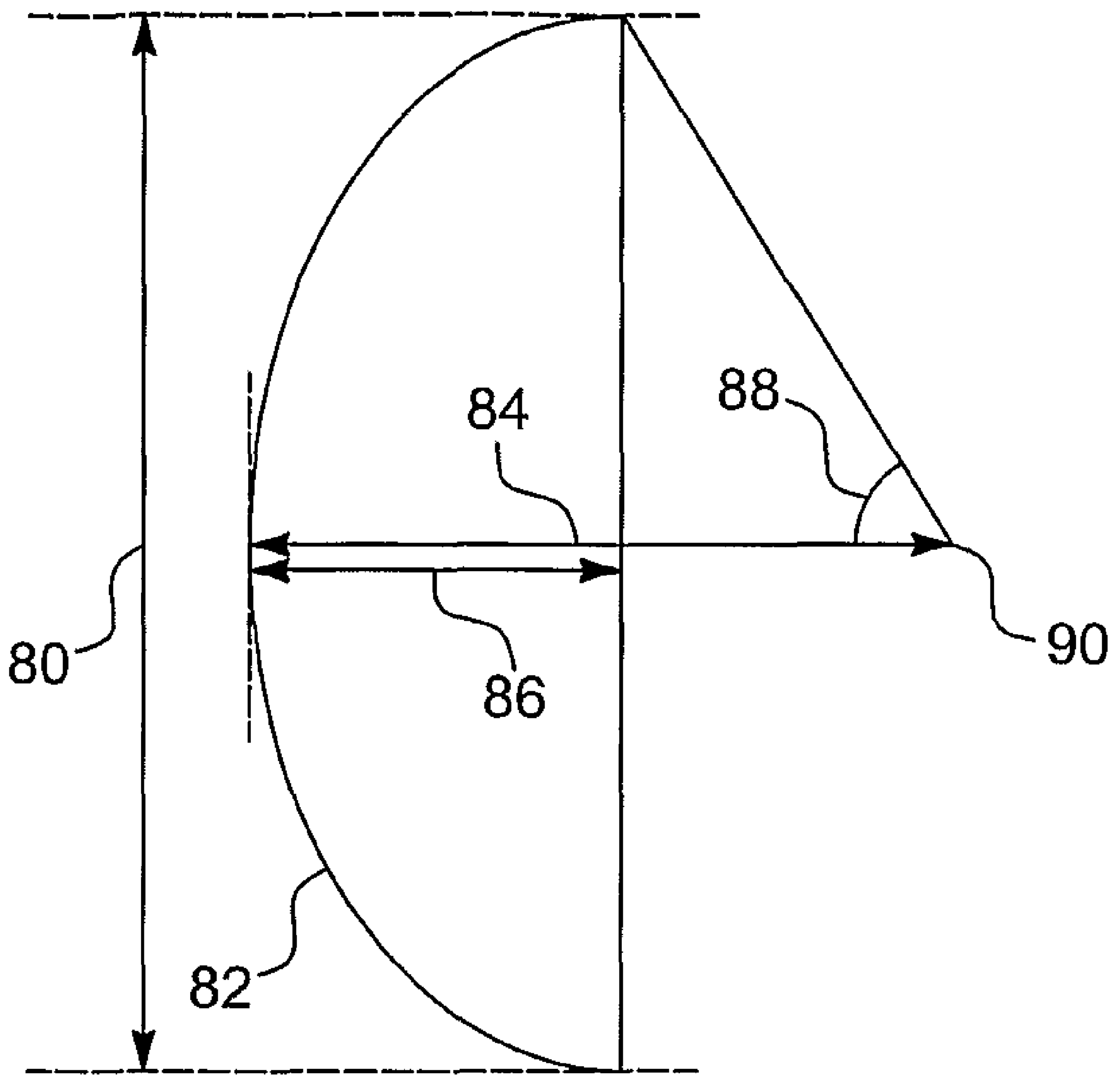
FIG. 3 is a side view of a spheroidal reflector according to a preferred embodiment of the present invention.

Reference is now made to FIG. 3 showing a side view of a reflector of a receiving antenna according to a preferred embodiment of the present invention. Diameter 80 of the spheroidally shaped reflector 82 is denoted by "D". A parameter p is defined by the ratio of the focal length 84, denoted by "f" and D: p=f/D. The depth 86 of the reflector is denoted by "d" and aspect angle 88 by which reflector 82 is seen from the focus 90, is denoted by "$\phi$". The depth of the reflector d and the aspect angle $\phi$, are represented by the equations 10 and 11, respectively:

$$d \approx \frac{f}{16p^2}\left[1 + \frac{f}{L}\left(1 + \frac{1}{4p^2}\right)\right] \tag{10}$$

$$tg(\phi/2) \approx \frac{D}{4f}[1 + (f/L)^2]. \tag{11}$$

Physical Features of the Reflector of the Receiving Antenna

In a case in which a conical feed having an angular radiation pattern given by $E_{feed}(\theta)=\cos^n\theta$, is disposed at focus 90, where "$E_{feed}$" denotes the magnitude of the electric field at the plane of the feed, as a function of the angle "$\theta$", measured relative to the axis of the reflector (similarly to the angle $\phi$), the radial pattern of the electric field across a plan of the aperture of the reflector is depicted in equation 12:

$$\frac{E_{appert}(r)}{1 + (r/R)^2} = \frac{[1 - (r/R)^2]^n}{[1 + (r/R)^2]^{n+1}}, \tag{12}$$

"$E_{appert}$" is the magnitude of the electric field and "R" is given by equation 8.

Fitting a Gaussian beam to this radiation pattern at the edge of the reflector, for a value of "r" given by r=D/2 results in a waist diameter of the beam represented by equation 13:

$$w = \frac{0.35D}{\sqrt{((n+1)\log_{10}(1 + (D/2R)^2) - n\log_{10}(1 - (D/2R)^2))}}, \tag{13}$$

where D is the diameter of the reflector, R is given by equation 8, and n is an integer whose values are n=1, 2, . . . . The minimal waist diameter $w_0$ is represented by the equation 14:

$$w_0 = \frac{w}{\sqrt{1 + (\pi w^2 q/2\lambda R)^2}}, \tag{14}$$

where w is the maximal waist diameter as is given by equation 13, q and R are as defined in equations 7 and 8 respectively, and $\lambda$ is the wavelength of the imaging system. The range $z_0$ to the minimal spot which is the point in which the waist diameter reaches its minimal value is given by equation 15:

$$z_0 = \frac{(\pi w^2/2\lambda L)^2 L}{1 + (\pi w^2/2\lambda L)^2}. \tag{15}$$

Therefore the beam width according to the present invention at any range z from the reflector is given by equation 16:

$$w(z) = \frac{w}{\sqrt{1 + (\pi w^2/2\lambda L)^2}} \sqrt{1 + \{\lambda/\pi w^2[z(1 + (\pi w^2/2\lambda L)^2) - (\pi w^2/2\lambda L)^2 L]\}^2} \tag{16}$$

The minimal waist diameter results a minimal resolvable spot by the imaging system at the range $z_0$ that closely equals the detection range L. The depth of the field of an imaging system of the invention is defined by means of equation 16, as the difference between the two "z" values in which the beam widths equal for example twice its minimal value, which is the waist diameter.

Example 1

The physical features of the receiving antennae such as minimal waist diameter, range to the minimal spot and depth of field, derived by employing the approximate equations according to the present invention were evaluated by comparing them to sizes of same parameters computed by employing physical optics (PO) techniques such as is implemented by the program GRASP9 of the TICRA company of Copenhagen Denmark. Table 1 below summarizes some exemplary cases in which the minimal waist diameters were computed according to equation 14 and the depths of field were computed by employing equation 16 and solving for the points in which the beam widths equal twice the waist diameter.

TABLE 1

Parameters of exemplary reflectors of receiving antennae.

| frequency [GHz] | 220 | 640 | 1500 |
|---|---|---|---|
| focal Length [m] | 0.2 | 0.05 | 0.01 |
| reflector depth [m] | 0.08 | 0.02 | 0.06 |
| minimal waist diameter [m] | 0.058 | 0.04 | 0.025 |
| depth of field [m] | 3.9 | 5.3 | 4.9 |

The corresponding values derived by employing GRASP9 agree up to some tens of percents with the sizes computed according to the invention such as shown in table 1. The ranges to the minimal spot were about the same according to both the approximate equation 15 of the invention and the numerical results of the GRASP9. The minimal waist diameters and the depths of field as a function of frequency according to the invention follow the actual results derived by means of GRASP9.

Example 2

An active imaging system for imaging targets at a detection range of 20 meters according to a preferred embodiment of the present invention, includes a receiving antenna with a spheroidal reflector. The focal length of the receiving antenna is 0.35 meter, which, jointly with the detection range determines the values of the major and minor axes of the spheroid, according to the aforementioned equations 3 and 9, to be of 10 and 2.62 meters respectively. The diameter, of the reflector is 0.6 meter and the depth of the reflector according to equation 10 is about 0.14 meter.

A transmitter radiating energy at a frequency of 100 GHz is disposed aside the reflector such that it substantially homogenously illuminates a region of a few meters around the second focus. A planar, rectangular detector array is disposed at the first focus (which is located at a distance of 0.35 meter from the reflector's apogee). The transmitter, detector array and the connection between the detector array and an imaging processor are as in the prior art. Radiation reflected from targets within a range of a few meters around the second focus of the spheroidal reflector (distanced from the reflector by about 20 meters) and further converged by the reflector of the receiving antenna, impinges the detector array. Images of targets such as of concealed objects under clothing are generated and displayed over a screen of the operator interface unit of the AIS. Spatial resolution of the images received is consistent with the computed minimal waist diameter of 0.084 meters, according to equation 14. The computed depth of field according to equation 16 of 3.7 meters, equals about half of its measured value which is 7 meters.

The invention claimed is:

1. An imaging system operative in a range of electromagnetic frequencies, said imaging system comprising:

at least one receiving antenna; and a spheroidal reflector of said at least one receiving antenna, where a and b are the lengths of the major and minor axes of said spheroidal reflector, respectively, wherein said axes conform with the equations:

$$a \approx L/2,$$

$$b = \sqrt{fL(1-f/L)}, \text{ where}$$

L is the detection range of said imaging system and f is the focal length of said spheroidal reflector; and wherein said range of electromagnetic frequencies start from X band and include the terahertz region.

2. The imaging system as in claim 1, further comprising at least one transmitter illuminating a region about the focus at the far side of said spheroidal reflector.

3. The imaging system as in claim 1, further comprising at least one array of detectors disposed at a focus adjacent said reflector.

4. A method for manufacturing a spheroidal reflector for a receiving antenna of an imaging system operative in a range of frequencies, said method comprising:

selecting a detection range and a focal length for said imaging system;

selecting the axes of said spheroidal reflector to conform with the equations:

$$a \approx L/2, \text{ and}$$

$$b = \sqrt{fL(1-f/L)}, \text{ where}$$

a and b are the lengths of the major and minor axes of said spheroidal reflector, respectively, f is said focal length, and L is said detection range of the reflector; and said range of frequencies start from X band and include the terahertz region.

5. The method as in claim 4, further comprising selecting a ratio between said focal length and the diameter of said reflector, wherein said spheroidal reflector has a depth "d" specified by the equation $$d \approx \frac{f}{16p^2}\left[1 + \frac{f}{L}\left(1 + \frac{1}{4p^2}\right)\right],$$

where f designates said focal length, L is said detection range, and p is said ratio.

6. The method as in claim 4, wherein the spatial resolution of an image of a target located at about said detection range and generated by said imaging system having a given wavelength within said range of frequencies, is substantially promoted by selecting said focal length and said diameter of said reflector such that the value of the minimal waist diameter decreases, wherein said minimal waist diameter is designated by "$w_0$" and is given by the equation:

$$w_0 = \frac{w}{\sqrt{1 + (\pi w^2 q / 2\lambda R)^2}},$$

where w is given by the equation:

$$w = \frac{0.35D}{\sqrt{(2\log_{10}(1 + (D/2R)^2) - \log_{10}(1 - (D/2R)^2))}},$$

and q is given by the equation:

$$q \approx \frac{4f}{L}\left(1 - \frac{f}{L}\right),$$

and

R is given by the equation:

$$R \approx 2f\left(1 - \frac{f}{L}\right),$$

and

D is said diameter, f is said focal length, L is said detection range and λ is said wavelength.

7. The method as in claim 6, wherein the spatial resolution carried out according to the dimensions of the antenna and focal length in accordance with the equation:

$$w(z) = \frac{w}{\sqrt{1 + (\pi \mathrm{w}^2 / 2\lambda L)^2}}$$

$$\sqrt{1 + \{\lambda / \pi \mathrm{w}^2 [z(1 + (\pi \mathrm{w}^2 / 2\lambda L)^2) - (\pi \mathrm{w}^2 / 2\lambda L)^2 L]\}^2}$$

wherein w(z) is the beam width at any range z from the reflector.

* * * * *